(No Model.)

G. STREICH.
LUMBER RACK.

No. 400,015. Patented Mar. 19, 1889.

Witnesses:
H. A. Foeller
J. P. Jenson

Inventor
Gabriel Streich
per N. N. Waterhouse
Attorney

UNITED STATES PATENT OFFICE.

GABREIL STREICH, OF OSHKOSH, WISCONSIN.

LUMBER-RACK.

SPECIFICATION forming part of Letters Patent No. 400,015, dated March 19, 1889.

Application filed October 22, 1888. Serial No. 288,771. (No model.)

*To all whom it may concern:*

Be it known that I, GABREIL STREICH, a citizen of the United States, residing at Oshkosh, in the county of Winnebago and State of Wisconsin, have invented certain new and useful Improvements in Lumber-Racks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in lumber-racks, and the objects of my improvements are, first, to unload an entire wagon or truck load of lumber at once without separating or dividing the load; second, to reduce the time required to unload to a minimum rate; third, to require only one man's labor to unload; fourth, to adjust the load properly upon the wagon. I attain these objects by the construction and mechanism illustrated in the accompanying drawings, in which—

Figure 1:
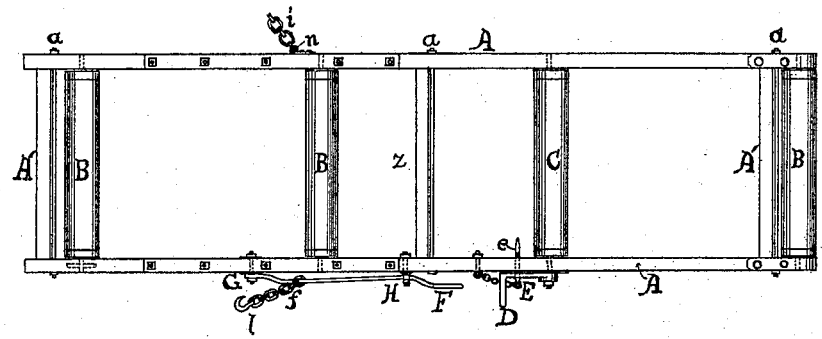
Figure 2:
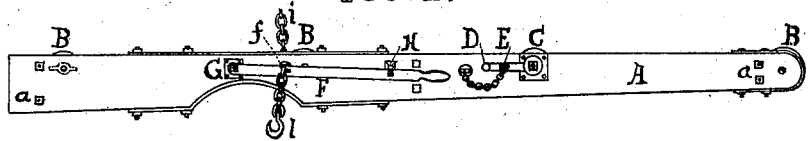

Figure 1 is a top view of the rack, and Fig. 2 a side view.

This rack is intended to be placed upon an ordinary lumber-wagon or upon a lumber-truck, the rack resting upon the bolsters of the wagon, although it may be constructed integral with the wagon, there being no rear bolster, the rack being fastened to the axle.

Similar letters refer to similar parts through out both the views.

A A are the sides, and A' A' the ends, of the rack, the rear end being to the right of the figure.

B B B are the free rollers, turning in pivotal bearings in opposite sides of the rack and projecting above the rack far enough to clear the lumber from the rack.

C is the friction-roller, being the same as the free rollers, except that it is attached to and turned by the crank D. The crank D may be fastened and prevented from turning by the stop-pin E, which passes through a hole in the arm of the crank and through a corresponding opening in the side of the rack, as shown in Fig. 1. This pin is jointed at *e*, so that after passing through the side of the rack the jointed end drops down at right angles with the rest of the pin, thereby preventing the pin from dropping out by reason of the jolting of the wagon.

F is the binding-lever, attached to the side at the fulcrum G. To this lever a short piece of chain is attached at *f*, with a grab-hook, *l*, at the opposite end. Another chain, *i*, is attached to the opposite side of the rack at *n*, and after the lumber is loaded is passed over the load and down the side that the lever is on, the lever being raised. The grab-hook may then be inserted as far up the chain as thought desirable to properly bind. Then, by forcing the lever F down, so that it fastens in the notch H, the chain is tightened so as to bind the load and prevent spreading or sliding.

The frame A A A' A' is strengthened and braced by the cross-rods *a a a* and the cross-bar Z, which are considered a part of the frame.

The lumber is first piled upon the rack, so as to rest upon the rollers B B B and C, and is then bound by the chain *i* and lever F, as hereinbefore described.

When desiring to unload, the workman first unbinds the load by unfastening and raising the lever F. Then, pulling out the stop-pin E, he turns the crank D toward the rear. The roller C, working against the lower surface of the load, by friction propels it toward the rear of the rack until past the center, when the rear end drops to the platform or ground, and the wagon or truck may be driven or rolled forward from under the load, the rear roller supporting the load until the forward end of the load is reached. If the load is large, it is desirable to have two saw-horses or other support nearly as high as the top of the rack from the ground. The load can be rolled upon such supports with greater ease.

One man can easily perform the work of unloading in a very short time.

The load can be rolled backward or forward to adjust the weight properly to the wagon at any time.

Therefore, what I claim as my invention, and desire to secure by Letters Patent, is—

A removable lumber-rack adapted to be placed on a truck or wagon, consisting of a frame, transverse rollers, one of said rollers projecting above the other to support the load and provided with a crank, D, on the end to rotate it, a detent to normally lock the crank, and an adjustable chain and binding-lever to lock the load on the rack, substantially as and for the purpose described.

In testimony whereof I affix my signature in presence of two witnesses.

GABREIL STREICH.

Witnesses:
H. A. FOELLER,
J. P. JENSON.